United States Patent
Kries et al.

(10) Patent No.: US 7,077,389 B2
(45) Date of Patent: Jul. 18, 2006

(54) METHOD OF FORMING A MOLDED POWERTRAIN MOUNT ASSEMBLY

(75) Inventors: Jack R. Kries, Lebanon, OH (US); James D. Bolden, Dayton, OH (US); Eric O. Alder, Middletown, OH (US)

(73) Assignee: Delphi Technologies, Inc., Troy, MI (US)

( * ) Notice: Subject to any disclaimer, the term of this patent is extended or adjusted under 35 U.S.C. 154(b) by 185 days.

(21) Appl. No.: 10/341,789

(22) Filed: Jan. 14, 2003

(65) Prior Publication Data

US 2004/0135287 A1   Jul. 15, 2004

(51) Int. Cl.
*B60K 5/12* (2006.01)

(52) U.S. Cl. ..................... 267/153; 29/897.2

(58) Field of Classification Search ............... 267/141, 267/153, 292, 140.11, 141.4, 141.5, 293, 267/294; 248/632, 634, 638, 636, 300; 180/291, 180/300, 312, 292, 382; 264/276, 259, 262, 264/264; 428/416; 156/151, 313, 281; 29/897.2; 425/403

See application file for complete search history.

(56) References Cited

U.S. PATENT DOCUMENTS

| | | | | |
|---|---|---|---|---|
| 2,865,586 A * | 12/1958 | Paulsen | ............... | 267/141.4 |
| 2,973,951 A * | 3/1961 | Billing | ............... | 267/30 |
| 3,371,387 A * | 3/1968 | Cleereman et al. | ............... | 425/590 |
| 3,565,373 A * | 2/1971 | Frye | ............... | 267/140.3 |
| 3,588,008 A * | 6/1971 | Wyman | ............... | 248/635 |
| 3,702,178 A * | 11/1972 | Schulz | ............... | 267/140.3 |
| 3,731,896 A * | 5/1973 | Fehlberg | ............... | 267/140.3 |
| 6,292,995 B1 * | 9/2001 | Corbin et al. | ............... | 29/428 |
| 6,349,918 B1 * | 2/2002 | Bunker | ............... | 248/635 |
| 6,428,645 B1 * | 8/2002 | Rau | ............... | 156/151 |
| 6,547,226 B1 | 4/2003 | Shores et al. | | |
| 6,622,995 B1 | 9/2003 | Baudendistel et al. | | |
| 2003/0104212 A1 * | 6/2003 | Agarwal et al. | ............... | 428/416 |

* cited by examiner

*Primary Examiner*—Chris Schwartz
(74) *Attorney, Agent, or Firm*—Scott A. McBain

(57) ABSTRACT

The invention provides a method of forming a molded powertrain mount assembly. A metal insert is provided, the metal insert including an engine interface portion and a molded base interface portion. At least one seal member is positioned onto the engine interface portion of the metal insert. The metal insert with seal member is placed into a mold, and the mold is closed. Base material is introduced into the mold. The base material is restricted from flowing onto the engine interface portion of the metal insert using the seal member.

10 Claims, 4 Drawing Sheets

METHOD OF FORMING A MOLDED POWERTRAIN MOUNT ASSEMBLY

FIELD OF THE INVENTION

This invention relates generally to powertrain mounts. More specifically, the invention relates to a method of forming a powertrain mount assembly that prevents flashing of the molded powertrain base onto the engine interface portion of the powertrain mount.

BACKGROUND OF THE INVENTION

Rubber may be molded onto a metal insert to form various types of parts, including powertrain mounts. The metal insert is placed into a mold cavity shaped like the finished molded part, and the mold is closed. Rubber is injected into the mold, surrounding all or a portion of the metal insert and conforming to the shape of the mold cavity.

When multiple parts are molded simultaneously, a three-plate multi-cavity mold may be used. The top plate typically contains a single opening through which a stream of uncured rubber is injected into the mold. The bottom plate contains multiple cavities shaped like the finished molded part, each cavity having one or more openings through which the rubber flows. The middle plate, often called a "runner" plate, separates the stream of rubber that is injected through the top plate and directs it into the multiple cavities in the bottom plate. Because the rubber is viscous, high pressures (e.g., 200 MPa) are required to force the rubber through the single opening in the top plate, across the runner plate, and into each of the mold cavities below.

Once the parts are molded, they are heated to harden or cure the rubber. A typical temperature for curing rubber is 320° F., and a typical time is 10 to 15 minutes. The mold remains closed until the rubber is cured, exposing not only the mold cavity, but also the runner plate to the curing temperatures. Because rubber cannot be melted and reused once it has been cured, the hardened rubber in the channels of the runner plate must be removed after each molding process and thrown away. For this reason, runner plates are typically designed to provide maximum direction of the injected rubber with minimum waste.

Metal inserts are commonly shaped by stamping, resulting in slight variations in size and shape. Manufacturing tolerances for stamped metal inserts can be roughly 0.5 mm. The molds must be made slightly larger than the inserts to allow for the manufacturing tolerances. Because the rubber is injected at high pressure, it enters all available cavities, flowing into the spaces provided to accommodate the manufacturing tolerances of the metal inserts and coating even those portions of the inserts that must be free of rubber. In the case of a powertrain mount, for example, the section of the part that mounts to the engine must be free of rubber. The unwanted, excess rubber is called "flashing."

A number of processes have been used to avoid flashing or to remove it after molding. A typical means of avoiding flashing is to place a bite ring onto the metal insert at a point at which the rubber is to stop. The bite ring cuts into the metal, preventing the rubber from flowing past the bite ring and onto the portion of the insert that is intended to be rubber-free. Bite rings have a number of disadvantages. Because they actually "bite" into the metal, they may leave marks on the metal or cut into any coating that has been applied to the metal prior to molding. Bite rings also wear out quickly and must be replaced frequently. If a bite ring is not replaced at the first sign of wear, it may leak. In addition, a bite ring may be used only in a plane perpendicular to the mold operating plane. This prevents its use on any portion of a metal insert that is positioned vertically in the mold cavity.

If a bite ring or another means of preventing flashing is not used, the flashing must be removed after the part has been molded. A typical way of removing the flashing is by scratch brushing the part. Again, this can leave marks on the metal or remove a coating that has been applied to the metal before molding. If the metal insert is coated after the molding step, rather than before, extra care must be taken to avoid applying the coating to the rubber in addition to the metal insert.

It would be desirable, therefore, to provide a method of forming a molded powertrain mount that overcomes the aforementioned and other disadvantages.

SUMMARY OF THE INVENTION

One aspect of the invention provides a powertrain mount assembly. The assembly comprises a metal insert that includes an engine interface portion and a molded base interface portion. At least one seal member is positioned on the engine interface portion. A molded base operably covers the molded base interface portion and at least a portion of the seal member. The seal member substantially prevents flashing of the molded base onto the engine interface portion.

Another aspect of the invention provides a method of forming a powertrain mount. A metal insert is provided, the metal insert including an engine interface portion and a molded base interface portion. At least one seal member is positioned onto the engine interface portion of the metal insert. The metal insert with seal member is placed into a mold, and the mold is closed. Base material is introduced into the mold. The base material is restricted from flowing onto the engine interface portion of the metal insert using the seal member.

The aforementioned, and other features and advantages of the invention, will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

One aspect of the present invention is a powertrain mount assembly.

Figure 1:
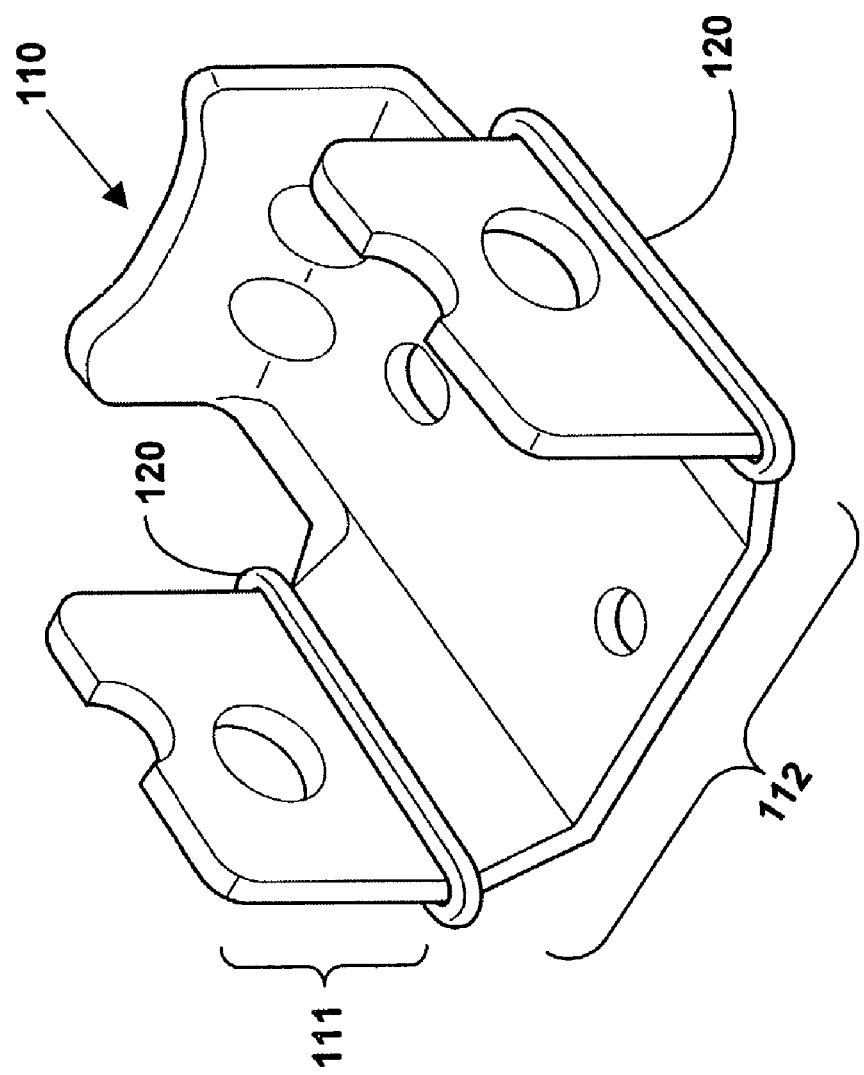
FIG. 1 is an illustration of a metal insert and seal members for a powertrain mount assembly in accordance with the current invention.

FIG. 1 is an illustration of a metal insert 110 and seal members 120 for a powertrain mount assembly in accordance with the current invention. Metal insert 110 comprises an engine interface portion 111 and a molded base interface portion 112. Two seal members 120 are shown in place on engine interface portion 111.

Metal insert 110 may comprise a stamped metal, for example steel, and may bear a protective coating such as a polymeric coating applied by an autophoretic or autodeposition process. This coating may be applied to the metal insert prior to forming a molded base onto the insert.

The engine interface portion 111 of metal insert 110 is intended to remain free of molded base material. Engine interface portion 111, as shown in FIG. 1, comprises first and second opposing mounting ears for mounting to a vehicle engine.

Molded base interface portion 112 is the portion of metal insert 110 that is covered with a molded base. Molded base interface portion 112 may mount to the vehicle frame.

Seal member 120 may comprise an O-ring. At least one seal member 120 may be positioned on each mounting ear of the engine interface portion 111 of metal insert 110. These seal members substantially prevent flashing of the molded base material onto the engine interface portion 111 of metal insert 110.

Figure 2:
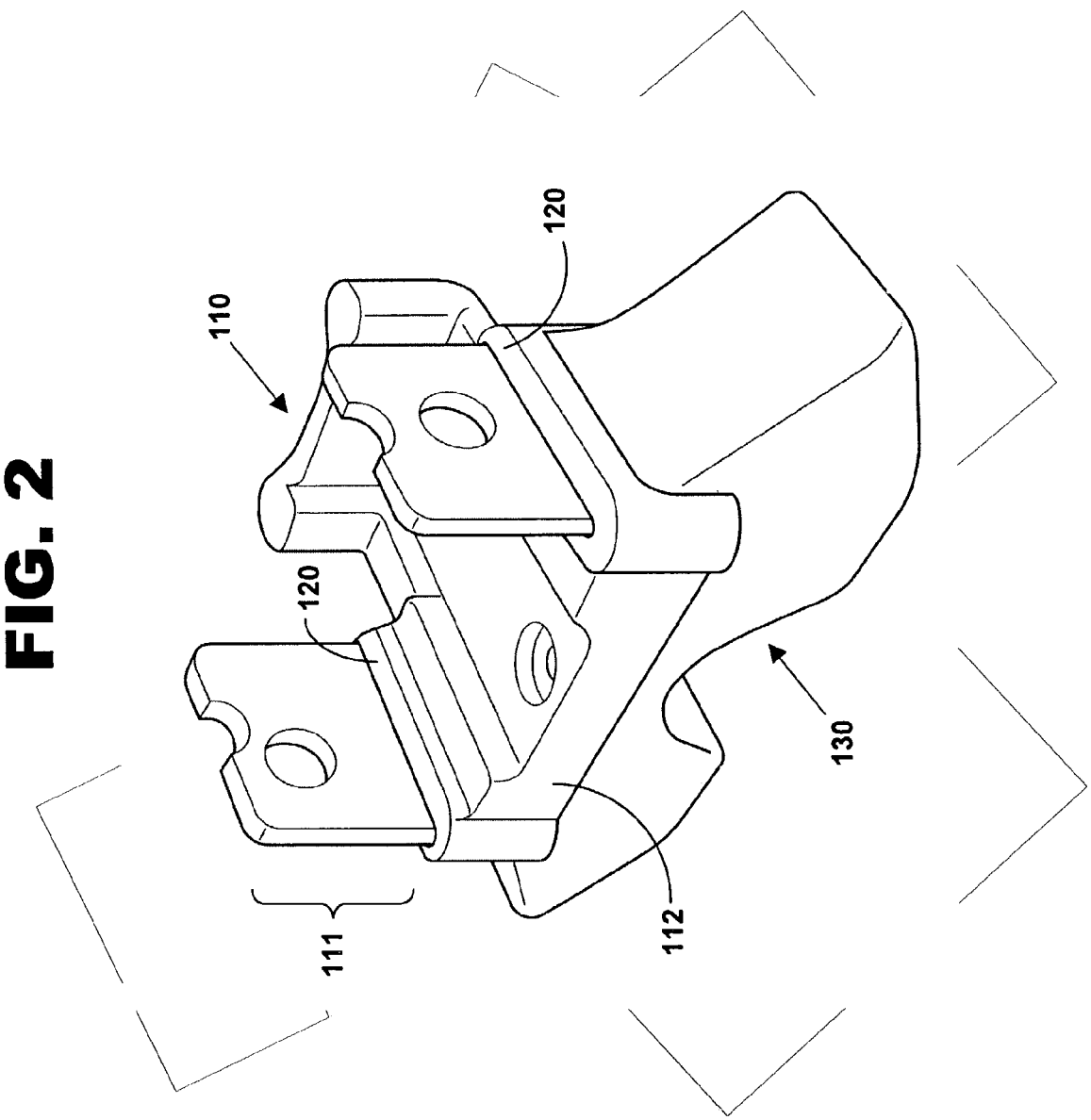
FIG. 2 is an illustration of one embodiment of a powertrain mount assembly including the metal insert and seal members shown in FIG. 1, in accordance with the current invention.

One embodiment of a molded powertrain mount assembly including the metal insert and seal members shown in FIG. 1, in accordance with the current invention, is illustrated in FIG. 2. The powertrain mount assembly comprises a metal insert 110, at least one seal member 120, and a molded base 130. Metal insert 110 includes an engine interface portion 111 and a molded base interface portion 112.

Molded base 130 is formed when base material is introduced into a mold to cover the molded base interface portion 112 of metal insert 110 and at least a portion of each seal member 120. As seen in FIG. 2, the molded base material has bonded to the two seal members shown in FIG. 1, thereby forming a substantially unitary structure.

The molded base material may be, for example, natural rubber, reclaimed rubber, synthetic rubber, and combinations thereof. The seal members may be molded from the same material as the molded base.

Figure 3:
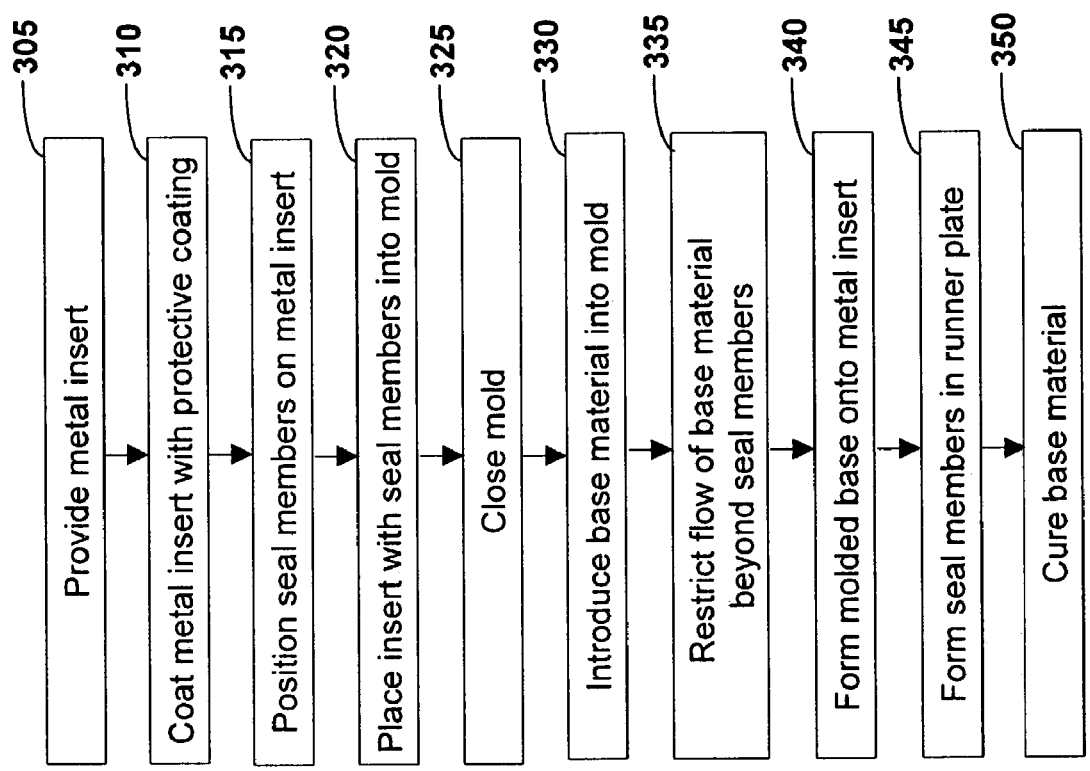
FIG. 3 is a flow diagram of one embodiment of a method of forming a molded powertrain mount.

Another aspect of the present invention is a method of forming a powertrain mount. FIG. 3 shows a flow diagram of one embodiment, in accordance with the present invention.

In this embodiment, a metal insert 110 is provided (Block 305). The metal insert includes an engine interface portion 111 and a molded base interface portion 112. The metal insert is covered with a protective coating such as a polymeric autophoretic or autodeposition coating (Block 310).

Seal members, for example O-rings, are positioned onto the two opposing mounting ears of the engine interface portion of the metal insert (Block 315). The seal members should be properly positioned such that they will not roll or otherwise be dislodged when placing the insert into the mold.

The metal insert with seal members is placed into a mold (Block 320) with the mounting ears of engine interface portion 111 pointing downward, away from the runner plate, and the molded base interface portion 112 of the metal insert nearest the runner plate. The mold is closed (Block 325), and base material is introduced into the mold (Block 330). The base material may be natural rubber, reclaimed rubber, synthetic rubbers, and combinations thereof.

Pressure of the base material entering the mold forces the seal members into a position in the mold cavity such that flow of the base material beyond the seal members is restricted (Block 335), thereby preventing flashing of the base material onto the engine interface portion of the metal insert.

The base material fills the rest of the mold cavity, covering the molded base interface portion of the metal insert and forming a molded base onto the insert (Block 340). Where the base material is in contact with a seal member, it bonds to the seal member, forming a substantially unitary structure. The bonded seal members remain with the powertrain mount throughout its functional life.

The base material also fills a runner plate that is designed not only to channel base material into the powertrain mount mold cavity, but also to form seal members for future powertrain mounts (Block 345). The base material in both the powertrain mount mold cavity and the mold runner plate is then cured (Block 350).

In practice, a powertrain mount obtained using the described method requires little or no deflashing, avoiding damage to any protective coating applied to the metal insert prior to molding. Labor costs are saved not only by eliminating the deflashing step, but also by allowing the part to be coated prior to molding. The seal members are acquired at minimal cost because they are formed in the runner plate of the powertrain mount mold.

Figure 4:
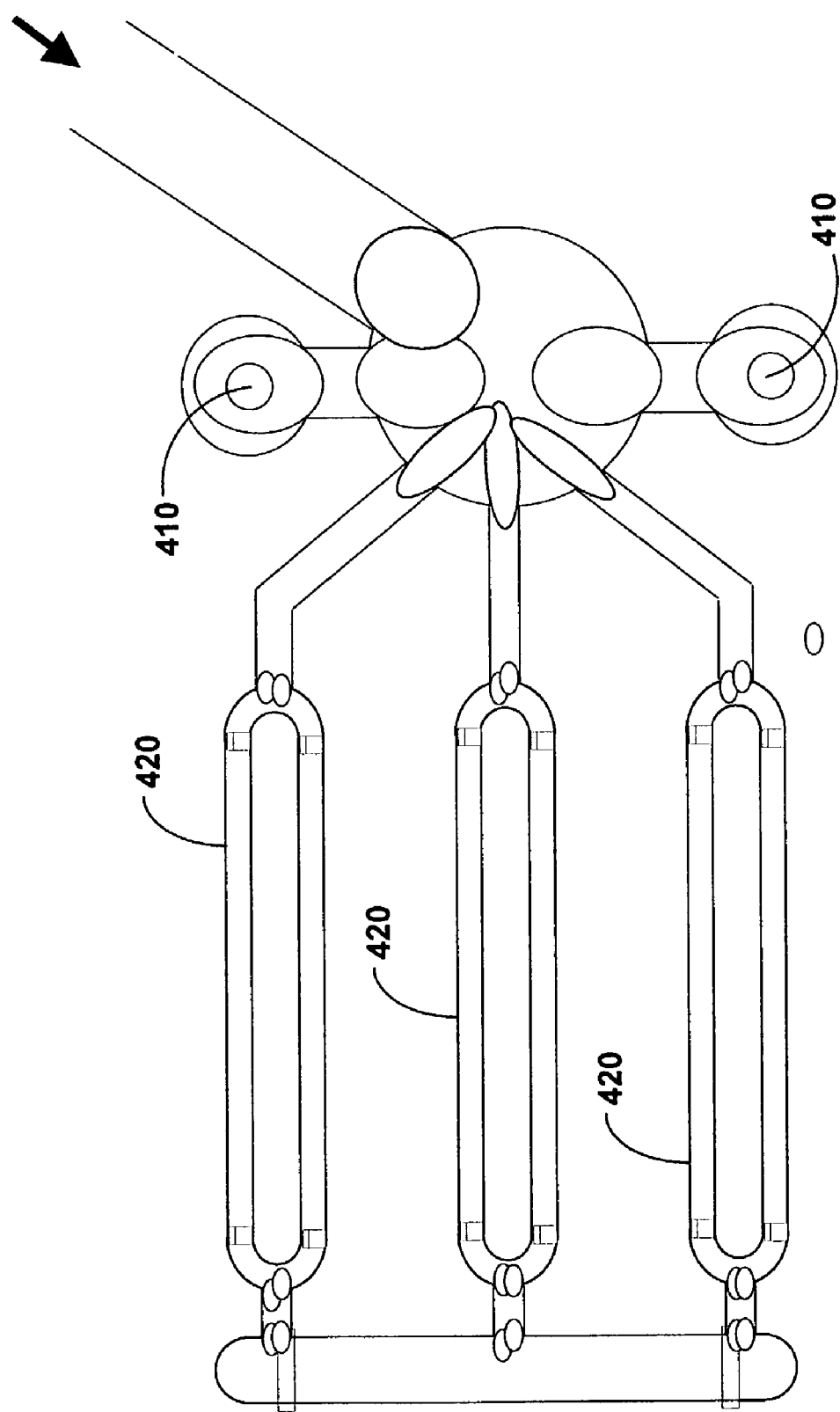
FIG. 4 is an illustration of one section of a runner plate designed to mold multiple seal members as well as to direct material into a powertrain mount mold cavity, in accordance with the current invention.

FIG. 4 is an illustration of one section of a runner plate designed to mold multiple seal members as well as to direct material into a powertrain mount mold cavity, in accordance with the current invention. Base material such as rubber is introduced through the top plate of a three-plate mold and is distributed across the runner plate. The arrow in FIG. 4 indicates the direction base material flows into the section of the runner plate that is shown. Base material flows down into the powertrain mount mold cavity (contained in the bottom plate of the three-plate mold) through two openings 410 in the runner plate. The base material also fills the seal member molds 420 formed in the runner plate. Those skilled in the art will recognize that multiple powertrain mounts may be molded simultaneously as well any desired number of seal members.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein.

The invention claimed is:

1. A method of forming a powertrain mount assembly, the method comprising:
   providing a metal insert, the metal insert including an engine interface portion and a molded base interface portion;
   positioning at least one seal member onto the engine interface portion of the metal insert;
   placing the metal insert with seal member into a mold;
   closing the mold;
   introducing base material into the mold; and
   restricting flow of the base material onto the engine interface portion of the metal insert using the seal member.

2. The method of claim 1 further comprising:
   covering the metal insert with a protective coating prior to positioning a seal member onto the engine interface portion of the metal insert.

3. The method of claim 2 wherein the protective coating is an autodeposition coating.

4. The method of claim 1 further comprising:

forming seal members for future powertrain mounts when the base material is introduced into the mold.

5. The method of claim 4 wherein the seal members are formed in a runner plate of the mold.

6. The method of claim 1 wherein introducing base material into the mold comprises covering a molded base interface portion of the metal insert, thereby forming a molded base.

7. The method of claim 1 wherein the base material is selected from a group consisting of natural rubber, reclaimed rubber, synthetic rubbers, and combinations thereof.

8. The method of claim 1 wherein the base material bonds to the seal member, forming a substantially unitary structure.

9. The method of claim 1 wherein restricting flow comprises preventing flashing of the base material onto the engine interface portion of the metal insert.

10. The method of claim 1 further comprising:

curing the base material.

* * * * *